United States Patent
Roth et al.

(10) Patent No.: US 7,813,288 B2
(45) Date of Patent: Oct. 12, 2010

(54) TRANSACTION DETECTION IN LINK BASED COMPUTING SYSTEM

(75) Inventors: Robert Roth, Olympia, WA (US); Bharadwaj Pudipeddi, San Jose, CA (US); Richard Glass, Olympia, WA (US); Madhu Athreya, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1070 days.

(21) Appl. No.: 11/284,459

(22) Filed: Nov. 21, 2005

(65) Prior Publication Data

US 2007/0121489 A1    May 31, 2007

(51) Int. Cl.
    *G01R 31/08* (2006.01)
(52) U.S. Cl. ..................... 370/241
(58) Field of Classification Search ........ None
    See application file for complete search history.

(56) References Cited

U.S. PATENT DOCUMENTS

| | | | |
|---|---|---|---|
| 6,009,488 A | 12/1999 | Kavipurapu | |
| 6,332,165 B1 * | 12/2001 | Hagersten et al. | 709/238 |
| 6,779,145 B1 | 8/2004 | Edwards et al. | |
| 7,062,540 B2 * | 6/2006 | Reddy et al. | 709/217 |
| 2002/0055999 A1 * | 5/2002 | Takeda | 709/224 |
| 2002/0156888 A1 * | 10/2002 | Lee et al. | 709/224 |
| 2003/0095555 A1 | 5/2003 | McNamara et al. | |
| 2003/0192034 A1 | 10/2003 | Hayase | |
| 2004/0139148 A1 * | 7/2004 | Norton et al. | 709/200 |
| 2004/0233851 A1 * | 11/2004 | Baldwin et al. | 370/241 |
| 2005/0117692 A1 | 6/2005 | Hunter et al. | |
| 2005/0198326 A1 * | 9/2005 | Schlimmer et al. | 709/229 |
| 2005/0289231 A1 * | 12/2005 | Harada et al. | 709/224 |
| 2006/0085543 A1 * | 4/2006 | Hrastar et al. | 709/224 |
| 2006/0155843 A1 | 7/2006 | Glass et al. | |
| 2006/0156065 A1 | 7/2006 | Glass | |
| 2006/0168199 A1 * | 7/2006 | Chagoly et al. | 709/224 |
| 2006/0168384 A1 * | 7/2006 | Radhakrishnan et al. | 710/260 |
| 2006/0248283 A1 * | 11/2006 | Galchev et al. | 711/141 |
| 2006/0294427 A1 | 12/2006 | Glass et al. | |
| 2007/0061433 A1 * | 3/2007 | Reynolds et al. | 709/223 |
| 2007/0094154 A1 | 4/2007 | Rau et al. | |

* cited by examiner

*Primary Examiner*—Chi H Pham
*Assistant Examiner*—Fan Ng
(74) *Attorney, Agent, or Firm*—Blakely, Sokoloff, Taylor & Zafman LLP

(57) ABSTRACT

A transaction detection device is described having inputs to couple to communication lines. Each communication line to transport notification of a packet observed by a link probe within a computing system containing point-to-point links between nodes. Each of said nodes having at least one processing core. The transaction detection device also comprises logic circuitry to determine from said notifications whether a looked for transaction has occurred within said computing system.

16 Claims, 8 Drawing Sheets

US 7,813,288 B2

TRANSACTION DETECTION IN LINK BASED COMPUTING SYSTEM

FIELD OF INVENTION

The field of invention relates generally to computing systems, and, more specifically, to transaction detection in a link based computing system.

BACKGROUND

Prior art multi-processor computing systems have typically used a "front side bus" between its one or more processors and its memory controller. FIG. 1 shows a traditional multi-processor prior art computing system. According to the depiction of FIG. 1, the front side bus 105 is a "shared medium" component in which electrical signals passed between any processor and any other processor and/or the memory controller 103 are carried over the same electrical wiring.

The front side bus 105 becomes a bottleneck, particularly for multi-processor systems, because there tends to be heavy communication over the front side bus 105 (through small communicative sessions called "transactions") between the processors 101_1 through 101_4 and the memory controller 103. In order to improve the performance of multi-processor systems, a new architecture has emerged (which may be referred to as "link based") in which the front side bus is replaced with a network having point-to-point links between the processors and memory controller.

FIG. 2 shows an example. Here, note that the system nodes 201_1 through 201_4 and memory controller 203 ("home agent") are communicatively coupled by a network 205 having point-to-point links between these components. For ease of drawing the point-to-point links are depicted as being bi-directional. Typically, however, these bi-directional point-to-point links are actually implemented with a pair of uni-directional point-to-point links directed in opposite directions with respect to one another. According to the architecture of FIG. 2, a "system node" is a unit containing one or more processing cores (e.g., one or more units of logic circuitry that executes program code). A "system node" may also have associated cache 202_1 through 202_4 for its respective processing cores.

Of interest in these systems are the transactions that occur over the network 205 between the system nodes 201_1 through 201_4 and memory controller 203 (e.g., to effect coherent caching and shared access to the system memory for data and/or instructions). Observing transactions for test and/or de-bug purposes in a system whose processing cores are interconnected through a mesh of point-to-point links (as depicted in FIG. 2) is significantly more difficult to accomplish as compared to systems whose processors are interconnected by a front side bus (as depicted in FIG. 1).

As just one perspective, in a front side bus system, each processor in the system can sense all activity on the bus initiated by the other processors. By contrast, a processing core in a point-to-point system has limited visibility into the activities of the processing cores of the other system nodes (e.g., system node 201_1 cannot detect the communications that exist on the point-to-point link that connects system node 201_2 and memory controller 203). As a consequence, a single transaction may involve the passing of multiple messages between different components on different point-to-point links. For instance, in order to issue a request from system node 201_1 for an item of data, separate requests for the data may be sent from system 201_1 to each of processors 201_2 through 201_4 and memory controller 203 along their respective point-to-point links.

In this sense, the transaction in the point-to-point link system is more difficult to detect and/or observe as compared to a corresponding transaction in a front side bus system because the transaction is developing over a plurality of communication structures (specifically, over a plurality of point-to-point links) as opposed to a single communication structure (specifically, a front side bus).

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
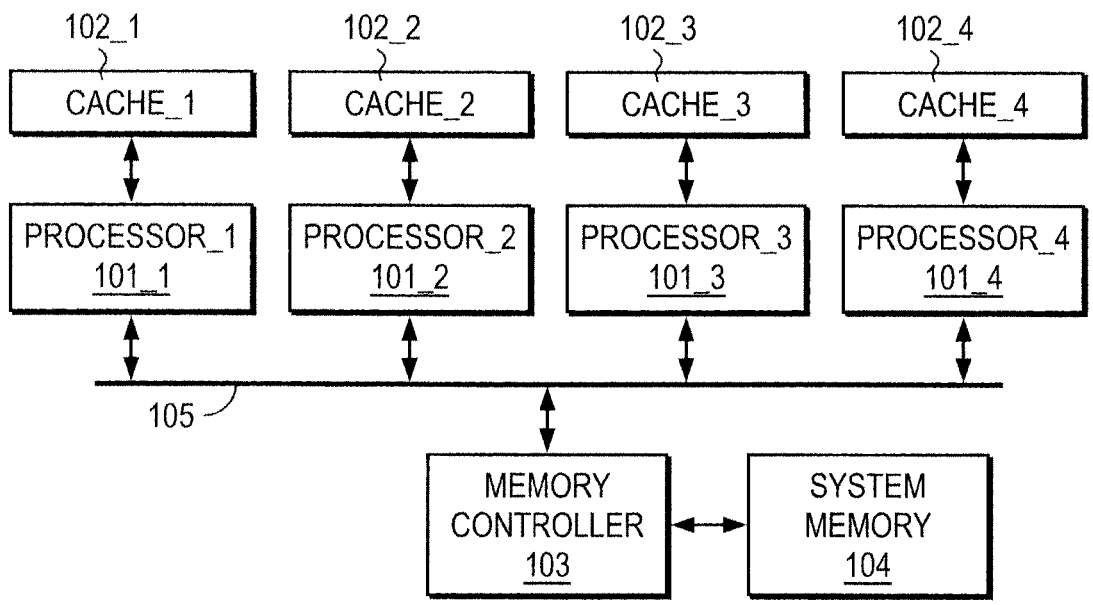
FIG. 1 shows a prior art multi-processor computing system having a front side bus.
Figure 3:
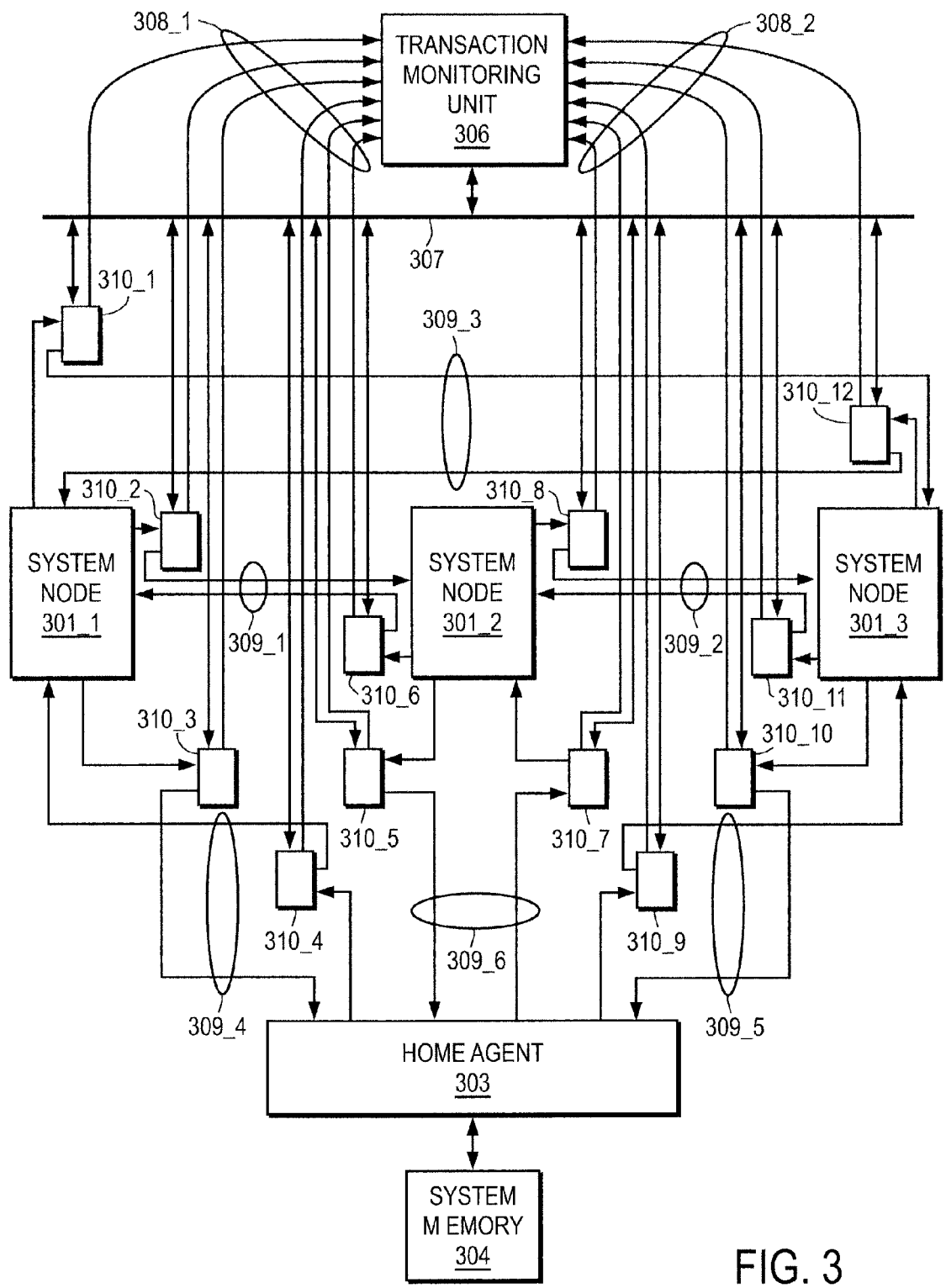
FIG. 3 shows a testing approach for detecting transactions in a link based computing system.

FIG. 3 shows a link based computing system having testing apparatus integrated into its network that is capable of detecting the initiation and completion of a transaction within the network. For ease of drawing cache regions are not drawn local to the system nodes, and, only three system nodes 301_1 through 301_3 are depicted. It should be understood that local caches may be being associated with the system nodes (e.g., as depicted in FIG. 1), and, the architecture depicted in FIG. 3 can easily be extended to a network having more than three (or just two) system nodes.

Figure 2:
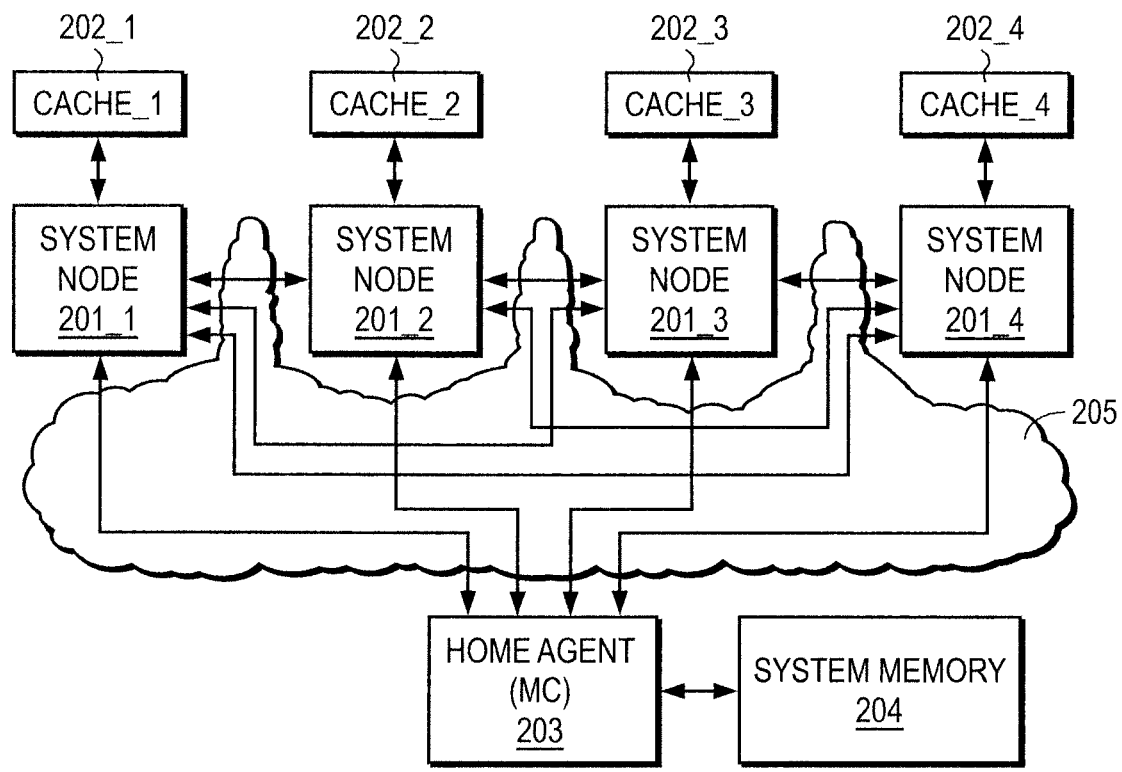
FIG. 2 shows a prior art multi-processor system having a network of point-to-point links in place of a front side bus.

Recall from the discussion of FIG. 2 that the bi-directional point-to-point links depicted in FIG. 2 may actually be implemented with a pair of uni-directional point-to-point links directed in opposite directions with respect to one another. FIG. 3 depicts this level of detail in that: 1) a first pair of oppositely directed unidirectional point-to-point links 309_1 effect the bi-directional communication between system nodes 301_1 and 301_2; 2) a second pair of oppositely directed uni-directional point-to-point links 309_2 effect the bi-directional communication between system nodes 301_2 and 301_3; 3) a third pair of oppositely directed uni-directional point-to-point links 309_3 effect the bi-directional communication between system nodes 301_1 and 301_3; 4) a fourth pair of oppositely directed uni-directional point-to-point links 309_4 effect the bi-directional communication between system node 301_1 and memory controller 304; 5) a fifth pair of oppositely directed unidirectional point-to-point links 309_5 effect the bi-directional communication between system node 301_3 and memory controller 304; and, 6) a sixth pair of oppositely directed uni-directional point-topoint links 309_6 effect the bi-directional communication between system node 301_2 and memory controller 304.

Each uni-directional point-to-point link observed in FIG. 3 is "intercepted" by a respective link probe 310_1 through 310_12 used for testing purposes. According to one embodiment, each link probe acts as a repeater that imposes little/no significant delay on its respective link while, nevertheless, permitting the signals on the link to be observed and forwarded to testing equipment (such as a logic analyzer). In an implementation, each link probe is capable of detecting on its respective unidirectional link a specific packet that the link probe has been programmed to look for. Each link probe may also be coupled to its own associated logic analyzer (not shown in FIG. 3) that analyzes sequences of looked for packets on the link probe's respective uni-directional link. A host computer (also not shown in FIG. 3) may be coupled to each of the logic analyzers and link probes so as to organize and/or orchestrate testing sequences on a link-by-link basis.

The aforementioned logic analyzers, however, only have visibility into their respective unidirectional links, and, as discussed in the background, a transaction in a link based computing system may involve a number of messages sent across different links. Therefore, observation and/or detection of entire transactions cannot be performed with a single logic analyzer, and, as elaborated on in more detail further below, integrating the logic analyzers together in order to effect "distributed" observation and/or detection of transactions (e.g., through the aforementioned host computer or traditional logic analyzer cross triggering) is impractical because of the different clocking sources associated with different system nodes 301_1 through 301_3 and different relative signal propagation delays imparted on the various uni-directional point-to-point links. Traditional cross triggering resources offered by logic analyzers offer only a simple pulse or level sent to one or many logic analyzers and thus would not support a match of transaction request and response as a data variable for the pair needs to be compared and matched in hardware for real time event detection.

A "centralized" transaction detection unit 306 is therefore needed where notifications of packets transmitted on the various links within the system are presented to a single "point" (i.e., transaction detection unit 306), where, the difference in arrival times to the single point of the various notifications are ideally the same as the difference in times at which their corresponding packets were actually presented on their corresponding links. For instance, if a first packet is transmitted on a first link 10 ns before a second packet is transmitted on a second link and 20 ns before a third packet is transmitted on a third link; then, the notification of the first packet arrives to unit 306 10 ns before notification of the second packet and 20 ns before notification of the third packet arrives to unit 306. The transaction detection unit 306 is configured with logic circuitry capable of analyzing these notifications so as to recognize packets appearing on different links that pertain to the same transaction.

Here, the single point aspect of transaction detection unit 306 can further be understood to involve a single clock domain (i.e., a region of circuitry whose clocking is ultimately sourced from the same oscillation circuitry ("clock source")) associated with the transaction detection unit 306 whose clock acts as a reference against which the differences in the arrival times of the various notifications can be measured. In this sense, the transaction detection unit 306 can be said to observe the activity occurring within the computing system's point-to-point link network "as if" it where a bus (albeit a fictional bus capable of simultaneous transportation of different lines of data and/or instructions). The link probes 310_1 through 310_12 are responsible for detecting "looked for" packets observed on their respective links and forwarding notification of the observation of these packets to the transaction detection unit 306. The link probes 310_1 through 310_12 are observed being coupled to the transaction detection unit 306 (by way of communication lines 308_1 and 308_2) for this purpose.

Figure 4:
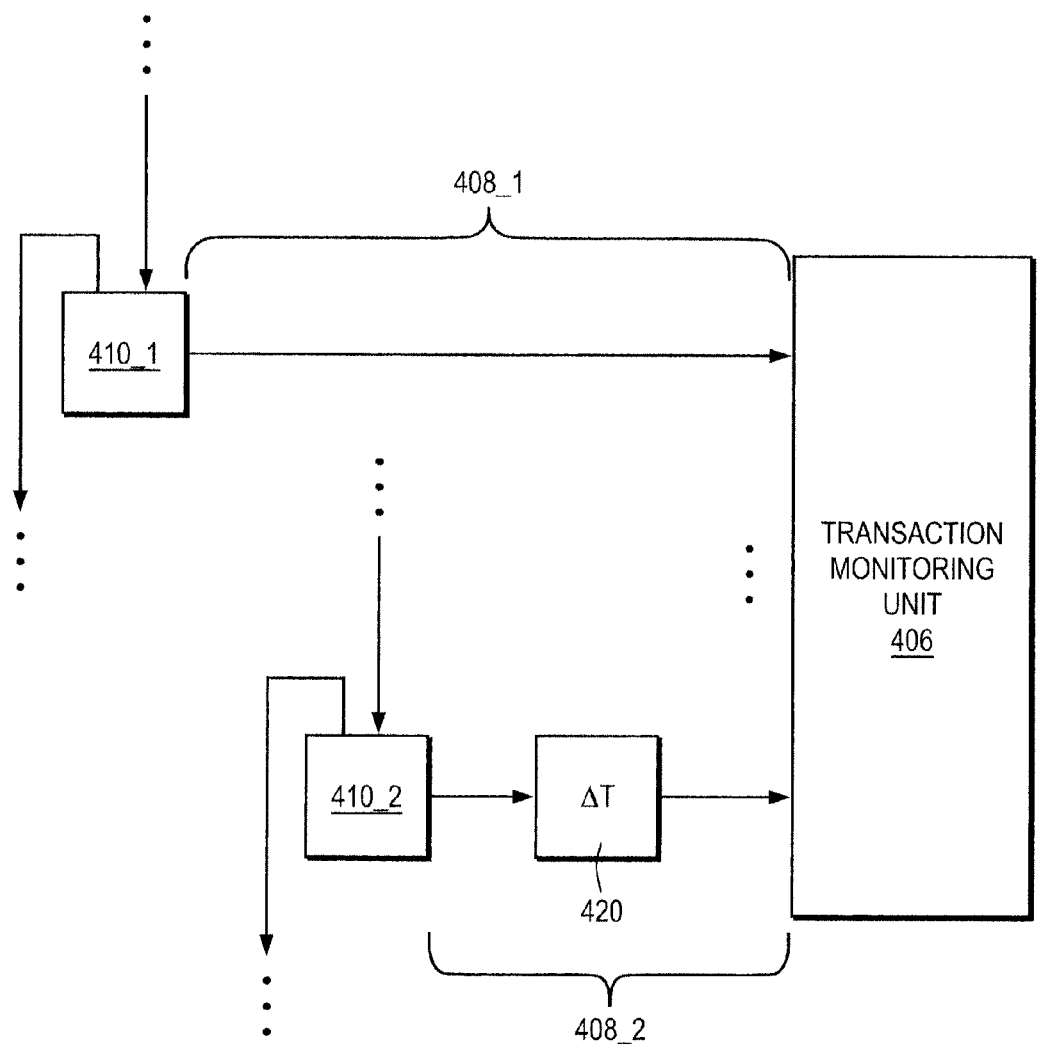
FIG. 4 shows an implementation detail in which differences in propagation delay between the network's link probes and the transaction detection unit are effectively canceled.

FIG. 4 elaborates on the timing details associated with the transaction detection unit 306. As described above, ideally, differences in the transmission times of looked for packets within the computing system's network are precisely reflected in the differences of the arrival times of their corresponding notifications to the transaction detection unit 406. In order to perfect this behavior, the propagation delays within the link probes 310_1 through 310_12 and along communication lines 308_1 and 308_2 of FIG. 3 need to be "matched" as closely as possible. That is, the delay through one link probe to the transaction detection unit 306 is ideally the same as the delay through any other link probe to the transaction detection unit 306. If this design goal is achieved, in theory, notifications "must" arrive at the transaction detection unit with the same relative time differences between one another as the observation of their corresponding packets with the computing system's network. This simplifies detecting events that only occur within a short period of time and the logic needed to detect related events within transaction detection unit 306.

FIG. 4 shows one technique for matching the propagation delays along communication lines 308_1 and 308_2. According to the depiction of FIG. 4, first and second link probes 410_1 and 410_2 are observed coupled to the transaction detection unit 406 through respective communication lines 408_1 and 408_2. Without the added delay unit 420, communication line 408_1 would have an inherently longer delay than communication line 408_2 because link probe 410_1 is, for instance, farther away from the transaction detection unit 406 than link probe 410_2 and therefore requires a longer run of wiring.

The delay unit 420, however, imposes delay into communication line 408_2 (e.g., equal to the difference in propagation delay resulting from the difference in the respective run lengths of the wiring between link probes 408_1, 408_2 and the transaction detection unit 406) that causes the propagation delay between link probe 410_1 and transaction detection unit 406 to be the same as that between link probe 410_2 and transaction detection unit 406. In a complete, system wide implementation every communication line between a link probe and the transaction detection unit 406 has some delay imposed, and, the communication line having the longest propagation delay amongst the communication lines is used as a reference that all other communication lines are configured to match their propagation delay to. In an alternate implementation the communication delay having the longest propagation delay does not have any delay imposed. In a third implementation, the relative delays are known and flags set with in the transaction monitor unit 406 logic to hold the detection of an event until a second event arrives late due to propagation delays. The flag can remain true for delta time period noted above and therefore the event sequence or detection of one event that is occurring at the same time or nearly the same time in the system can be detected by the instrumentation as occurring at or near the same time.

The other aspect of ensuring matched delay from each link detection point to the transaction detection unit is to ensure, as best as practicable, that the propagation delay within each of the link probes 310_1 through 310_12 is the same. If the events propagated to the transaction monitoring unit 306 are over sampled by a common clock (such as a traditional logic analyzer running in "timing mode") the events from separate links could be combined into a single combination of events, such as events on link 310_2 and 310_2 and 310_3 that occurred at the same time.

In a further implementation, a high clock speed for all communication lines 308 and 308_2 is determined from the same clock source within the transaction detection unit 306, and, moreover, the data for the communication lines is extended by the link probe so that, essentially, the communication lines and the logic circuitry within the link probe that forwards notifications to the transaction detection unit are all part of the same clock domain. In an alternate implementation a high speed clock from each link probe's associated logic analyzer is used as a high speed clock reference.

An alternative communication link between the link probes 310_1 to 310_12 and the transaction monitoring unit 306 could use a clock synchronous with the data on each link probe and then combined into a common clock domain within the logic of transaction monitoring unit.

Figure 5:
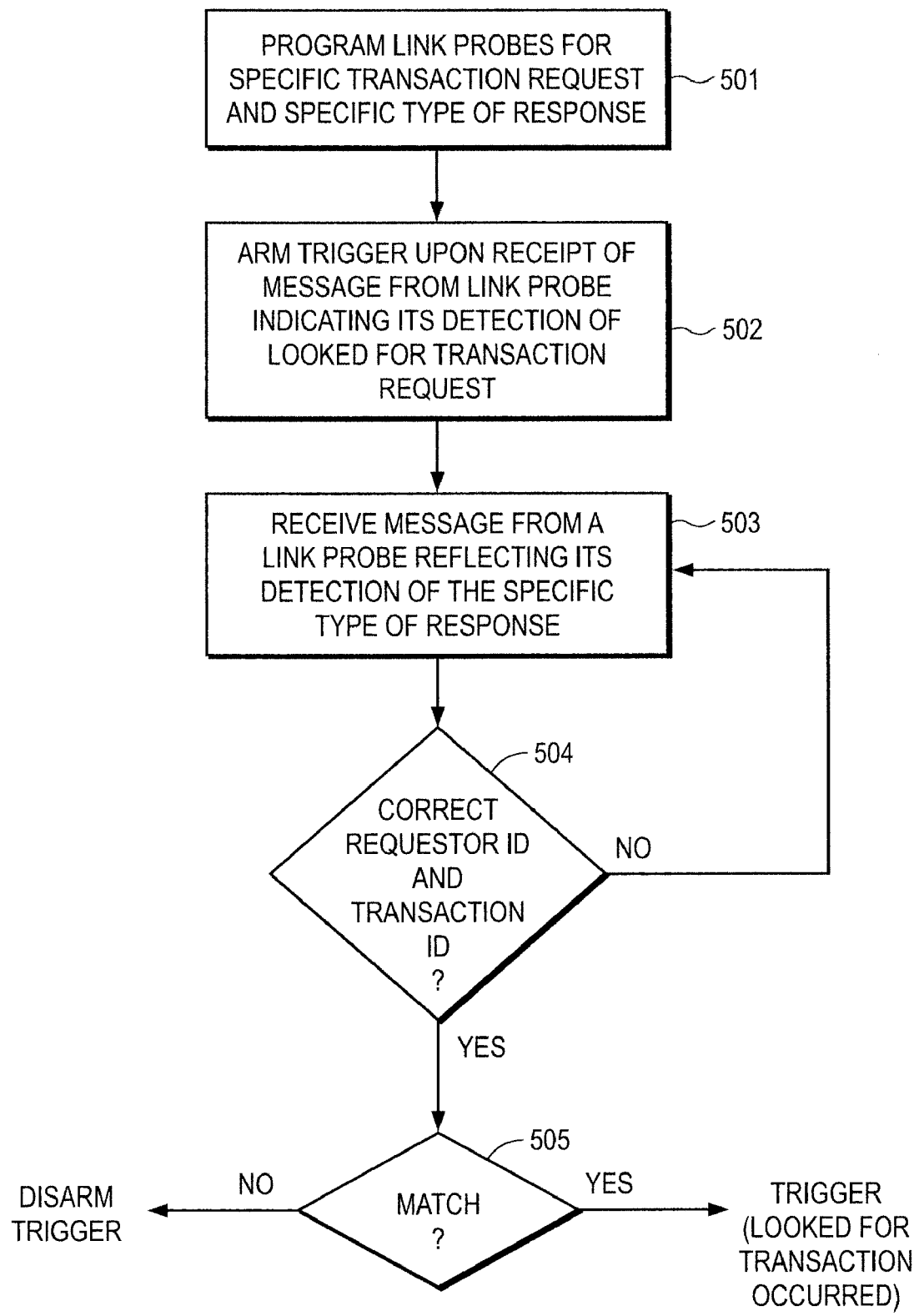
FIG. 5 shows a method for detecting the occurrence of a looked for transaction within a link based computing system.

FIG. 5 shows a methodology performed by the transaction detection unit 306 for detecting the occurrence of a looked for transaction. According to the methodology of FIG. 5, the transaction detection unit 306 first programs each of the link probes 310_1 through 310_3 to look for specific types of packets on their respective links. Essentially, the transaction detection unit 306 raises a "trigger event" signal when a specific looked for transaction is determined to have completed so that higher order monitoring/testing apparatus of the computing system can realize that the looked for transaction, in fact, happened.

A basic transaction involves a request by a requesting system node (e.g., any one of system nodes 301_1 through 301_3) for data at a specific address "X", and, a response from either: 1) another system node that has a valid copy "Y" of the data in its local cache (referred to as a "snoop response"); or, 2) the memory controller which accessed a valid copy "Y" of the requested data in system memory (referred to as a "data response"). Note that the requested data "Y" is supposed to be contained within the response regardless of which particular component happens to respond to the request.

According to one testing approach, assuming that system node 301_1 is the system node to issue the request for the transaction to be detected, at least those link probes 310_1, 310_2, 310_3 that intercept a unidirectional link that flows from node 301_1 are programmed 501 to look for a request for data at address X; and, at least those link probes 3104, 310_6, 310_12 that intercept a unidirectional link that flows into system node 301_1 are programmed to look for a particular type of response having data "Y" (e.g., a snoop response having data "Y" or a data response having data "Y"). Here bus 307 of FIG. 3 can be used to program the link probes.

Assume for simplicity that the link probes that intercept a link that flows into system node 301_1 are programmed to look for a "data response" having data Y. In this case, a complete transaction starts with the looked for request and ends with the looked for data response. In an implementation, in order to keep overhead low, the notifications sent by the link probes essentially contain three items of information: 1) the identity of the system node that has sent the request; 2) a transaction ID that has been assigned to the transaction (by the system node identified in 1) above); and, 3) whether or not the observed packet on the link contains the specific information that is being looked for (which, is address X in the case of the link probes programmed to identify the request, and, is data Y in the case of the link probes programmed to identify the data response).

In an implementation, the link probes programmed to look for the request (at least link probes 310_1, 310_2 and 310_3) will send a notification to the transaction detection device 306 for any request that they observe. This includes both requests that correspond to the looked for request and requests that do not correspond to the looked for request. That is, the link probes are configured to send a notification to the transaction detection device 306 whenever they observe a packet that corresponds to the "type" they are programmed to look for. In this case, the probes 310_1, 310_2, 310_3 that intercept a link that flows from system node 301_1 are programmed to look for a request, and, as a consequence, they will send a notification any time they observe a request.

However, only the notification (s) for the specific looked for request will identify the requestor node as node 301_1 and will indicate a "match" for address X. That is, recognizing the import of items 1) and 3) in the information contained in a notification provided just above, notifications for requests that do not correspond to the specific looked for request will indicate a "miss" (e.g., with a "0") because they do not contain address X and/or do not contain the identity of system node 301_1 as the requester. By contrast, notifications for requests that do correspond to the specific looked for request will indicate a "match" (e.g., with a "1") because they contain address X and will the identity system node 301_1 as the requestor.

After the link probes are programmed 501 and the transaction permitted to commence, the transaction detection device 306 will "arm" its trigger 502 when it receives a notification that signifies the looked for request has been sent. Note that the notification that signifies the looked for request has been detected will not only indicate the requestor system node (system 301_1) and a "match" on address X but also the transaction ID specified by the requesting system node 301_1. The transaction detection device 306, concurrently with the above processes, analyzes the notifications from the link probes configured to look for the response. Here, again, notifications are sent to the transaction detection device each time a "data response" is observed by a link probe that has been programmed to look for a data response (i.e., at least those link probes that intercept a link that flows into system node 301_1).

These will include notifications for both data responses that do not correspond to the specific transaction's response and those that do (i.e., notifications identifying different requester node identifications and/or transaction IDs than those that are being looked for as well as those that are being looked for). Essentially, for each notification that the transaction detection device receives from a link probe programmed to looked for a data response, the transaction detection device checks 503, 504 items 1) and 2) of the notification's contents to see if the notification contains: 1) the requestor node corresponding to the requestor of the transaction (system node 301_1); and, 2) the transaction ID for the transaction. Only a notification that contains both of these criteria corresponds to a data response for the transaction being detected. Once a notification is detected that meets these criteria, the notification is further analyzed 505 to see if the notification identifies a match with respect to the looked for contents of the response (i.e., data Y).

If a match exists, the transaction detection device 306 fires a trigger indicating that the looked for transaction has occurred. If a match does not exist, the transaction detection device disarms its trigger. Here, given that transactions are being detected to determine an exact point of interest to stop recording data in a system under test, note that it is altogether possible that the computing system may execute the transaction with a response data other than Y returned as the formal response to the request. The screening 504 against the match enables the transaction detection device 306 to discriminate between responses to the correct transaction that contain the correct data of interest match to a specific address and those that do not contain the correct data. According to one approach, if a transaction response has the correct transaction ID but incorrect response data (i.e., the process of FIG. 5 flows through "NO" from box 505 causing the trigger to dis-arm), the transaction is re-attempted within the computing system with (typically) a new transaction ID value. As such, after the trigger is disarmed, the process repeats from box 502 (where the new transaction ID for the re-attempt of the transaction will be reported).

In the example above, a data response (presumably from the memory controller 303) was looked for. In an alternate approach, the link probes expected to observe a response may be programmed to look for snoop responses from the non requesting system nodes (here, system nodes 301_2 and 301_3)—rather than a data response. In this case, the transaction detection device can recognize that a transaction will be completed some time after the snoop responses for all non requesting system nodes has been detected (because, according to a transaction protocol executed by the computing system, a data response which completes the transaction can only be sent after all snoop responses have been sent).

Figure 6:
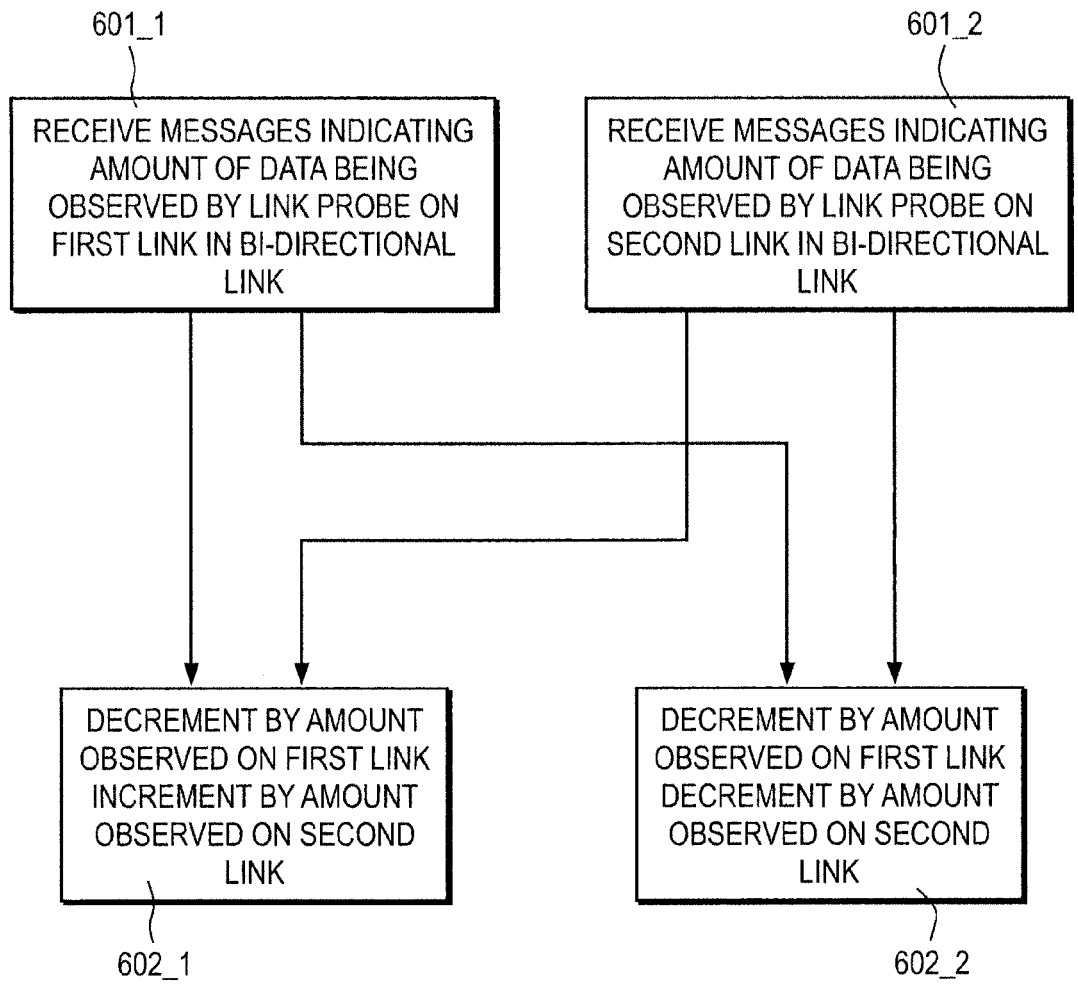
FIG. 6 shows a method for monitoring credit flows between components that communicate through a pair of uni-directional links.
Figure 7:
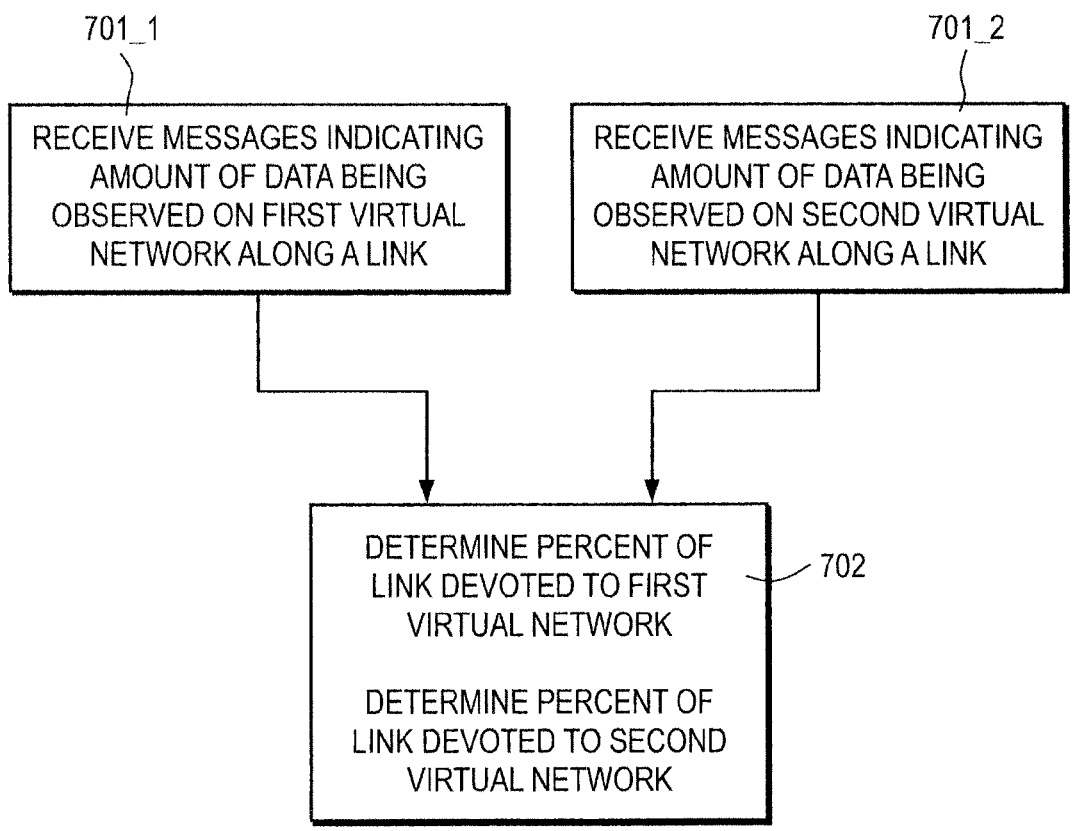
FIG. 7 shows a method for monitoring the relative amounts of traffic flowing on different virtual channels.

FIGS. 6 and 7 demonstrate that the placement of link probes coupled to a centralized monitoring device (such as the transaction detection device 306) allows for the monitoring of other system wide aspects of the link based computing system's network. Specifically, as detailed in FIG. 7, the credit flow control being executed on opposite ends of a bi-directional link can be monitoring to ensure proper operation. Referring briefly back to FIG. 3, note link probes 310_2 and 310_6 that intercept the respective unidirectional links that essentially effect the bi-directional link 309_1 between system nodes 301_1 and 301_2.

According to one implementation, the flow of information between these devices is controlled with credits. For instance, system node 301_2 can only have a maximum difference between the buffers of data (i.e., a fixed amount of data) that it has sent to system node 301_1 and the buffers of data that it received from system node 301_1 (e.g., a maximum difference of 5 buffers). Here, each buffer may be assumed to correspond to a credit. The inverse policy may be imposed in the direction from system node 301_1 to system node 301_2.

By designing link probes 310_2 and 310_6 to detect the credit flows flowing through them and reporting these credit flows to the transaction detection device 306, the transaction detection device 306 can determine whether a credit policy has been offended (i.e., the difference between data sent and data received as exceeded a preset maximum) through execution of the methodology of FIG. 7. Specifically, the transaction detection device receives notifications of credit flows 601_1, 601_2 from link probes 310_2 and 310_6 corresponding to a bidirectional link 309_1. Credit flows sent from a first node 301_1 are decremented from the total credit flows arriving at the same system node 301_1 to determine 602_1 the credit status the system node 301_1. The inverse is performed 602_2 to determine the credit status of the other system node 301_2.

FIG. 7 shows another method that can be executed by the transaction detection device to monitor the relative amounts of traffic being sent along a specific virtual channels within a specific virtual network the link based computing system's network. Here, as is known in the art, the resources of a network can be partitioned into different virtual networks, where, the point-to-point links within the network can be envisioned as having one or more virtual channels for each virtual network. The sending of a packet along a specific point-to-point link involves characterizing the packet as being sent along a specific virtual channel within a specific virtual network.

According to one implementation, each uni-directional link can be viewed has having been partitioned into three virtual networks VN0, VN1, and VNA where each virtual network may have multiple virtual channels on any particular uni-directional point-to-point link with the computing system. Moreover, at the transmission point into any point-to-point link, both the VN0 and VN1 virtual networks have a separate dedicated buffer (in this case a buffer can be viewed as a queue for holding packets just prior to their transmission) for each of its constituent virtual channels. By contrast, a single buffer is used for all virtual channels within the VNA network.

Here, a virtual channel in the VN0 or VN1 networks essentially has fixed buffering resources so as to avoid deadlock in message exchange protocols (because a message will either be sent immediately or not sent at all depending on whether or not space is available in the buffer), while, a virtual channel in the VNA network should exhibit overall faster service but is potentially more susceptible to deadlocking (because a packet to be transmitted is apt to not be blocked for lack of buffering, but, variation in queuing delay in the buffer may result in message exchange protocols executing out of synchronization).

According to a further design of the link probes, not only are the link probes capable of observing the amount of data being sent along their respective uni-directional point-to-point links—but also—the link probes are capable of identifying: a) a packet that belongs to a particular virtual channel within either of the VN0 or VN1 virtual networks; and/or, b) packet that belongs to any virtual channel within the VNA network. The former capability may be utilized to analyze the credit flow along a particular virtual channel within the VN0 or VN1 virtual networks or the credit flow within the VNA virtual network consistent with the methodology described just above with respect to FIG. 7. Moreover, these capabilities may be utilized to measure the relative amounts of traffic flowing on a VN0 or VN1 virtual channel vs. traffic flowing on the VNA network as depicted in the methodology of FIG. 8.

Figure 8:
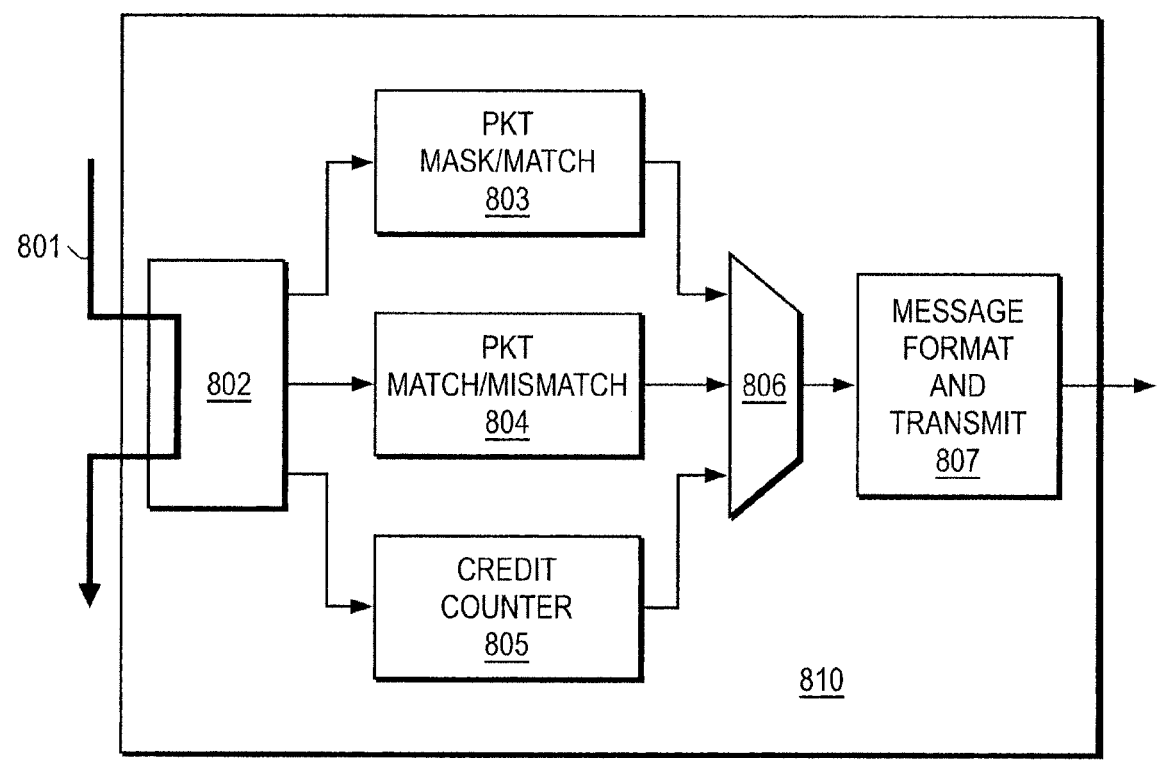
FIG. 8 shows a design for a link probe.

Specifically, referring to FIG. 8, the transaction detection device receives notifications from a link probe indicating the amount of traffic being sent within different virtual networks 701_1, 701_2 within the along its respective point-to-point link. The relative amounts of data being sent within then different virtual networks may then be compared and analyzed 702. For instance the amount of traffic being sent along a first virtual channel within the VN0 network may be compared against the amount of traffic being sent along a second virtual channel within the VN1 network. As another example, the amount of data being sent along a virtual channel within either of the VN0 or VN1 networks may be compared against the amount of traffic being sent within the VNA network. Conceivably, multiple links could be similarly analyzed so as to develop an understanding of the network as a whole rather than just a particular link.

FIG. 8 shows an exemplary architectural design 810 for a link probe as discussed above. Recall from the discussion of FIG. 5 that a link probe is expected to identify: 1) the identity of the system node that has sent the request; 2) a transaction ID that has been assigned to the transaction (by the system node identified in 1) above); and, 3) whether or not the observed packet on the link contains the specific information that is being looked for. Also recall from the discussion of FIG. 6 that a link probe is expected to be able to identify the amount of traffic (e.g., in terms of a credit count) being passed along its respective link, and, from the discussion of FIG. 7, that a link probe is expected to be able to identify the virtual channel and/or virtual channel that a packet is being sent along.

FIG. 8 shows regions of logic circuitry designed to identify various items within an observed packet as described above. Here, circuitry 802 corresponds to the circuitry that behaves as a repeater that can produce a copy of the packet observed on the link 801 without significantly delaying the packet. Repeater circuitry 801 is coupled to each of logic circuitry regions 803 (Packet Mask/Match), 804 (Packet Match/Mismatch) and 805 (Credit Counter). The Packet Mask/Match circuitry 803 analyzes the packet header to identify whether the packet is of the specific type that the link probe is designed to look for (e.g., a request, data response or snoop request as described with respect to FIG. 5, or, the virtual channel and/or virtual network as discussed above with respect to FIG. 5). In an embodiment, the Packet Mask/Match circuitry can also be used to identify the transaction ID and requester node of the packet's transaction as discussed above with respect to FIG. 5.

The Packet Match/Mismatch circuitry 804 analyzes the packet payload to see if it is carrying the data it is looking for (e.g., address X or data Y as discussed above with respect to FIG. 5). The Credit Counter circuitry 805 analyzes the packet payload (or pertinent section of the packet header) to determine how many credits of data the packet is transporting. As appropriate, the items of information to be incorporated into a notification to be sent to the transaction detection device are multiplexed (e,g, by multiplexer 806) into a single notification that is formatted and transmitted to the transaction detection device by circuitry 807. As discussed above with respect to FIG. 4, the timing of circuitry 807 may be timed with a clock and data timing optimized for interface with the transaction detection device.

Figure 9:
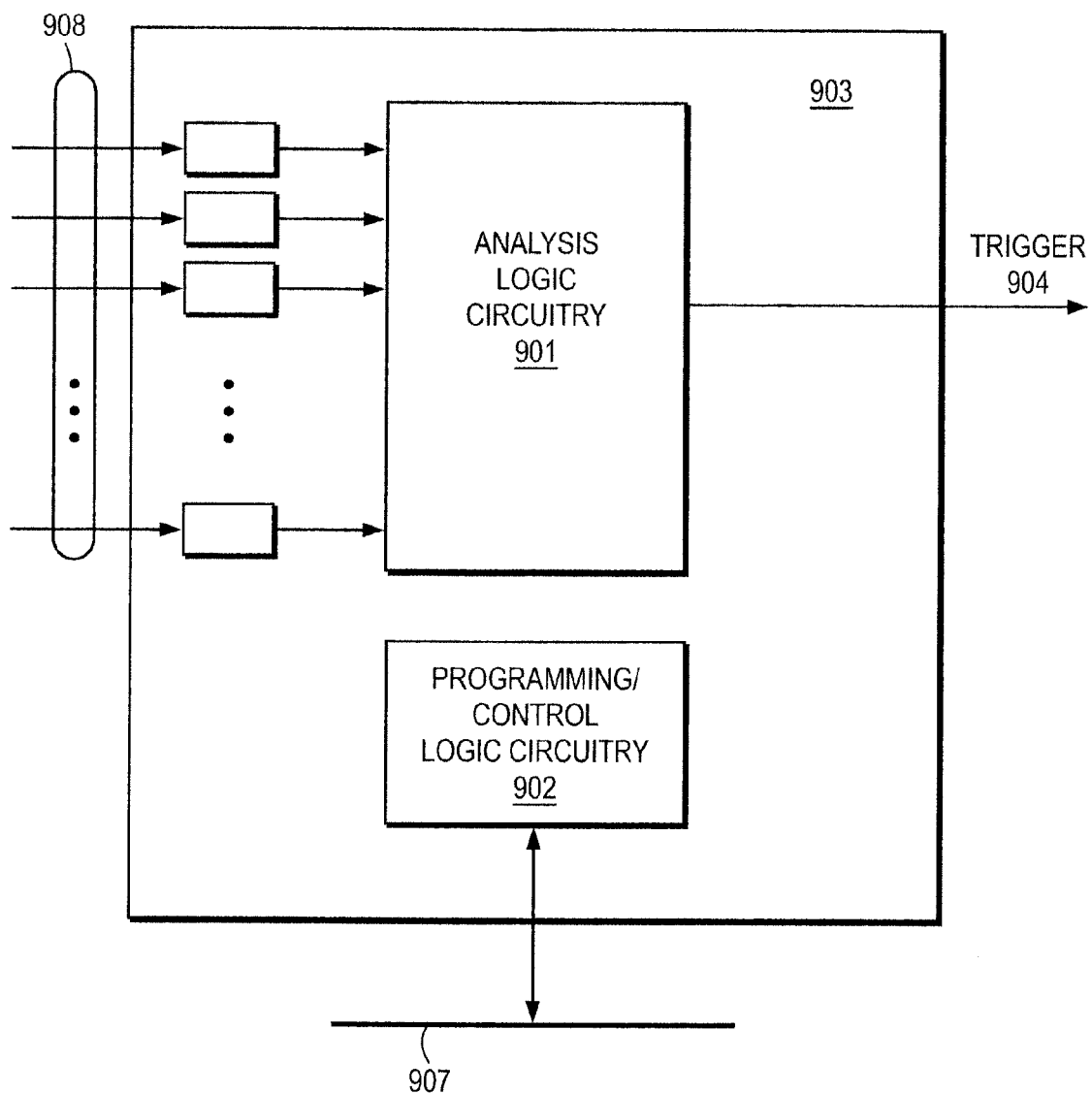
FIG. 9 shows a design for a transaction detection unit.

FIG. 9 shows a depiction of an architectural design for the transaction detection device 903. The communication lines from the link probes are received as input communication lines 908 (e.g., communication lines 308_1, 308_2 of FIG. 3 correspond to communication lines 908 of FIG. 9). Programming and control logic circuitry (which may include some kind of processing core) 902 is responsible for issuing commands that program the link probes over bus 907 (e.g., bus 307 of FIG. 3 corresponds to bus 907 of FIG. 9). Analysis logic circuitry 901 is responsible for performing the methods outlined above in FIGS. 5, 6 and 7. Various outputs may be provided such as a trigger signal 904 indicating that a specific looked for transaction has occurred.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   detecting with a link probe that observes packets transmitted on a point-to-point link that couples nodes within a computing system that a packet is of a looked for type, said packet being part of a transaction, said transaction including:
   i) a request for requested data at a specific address and;
   ii) a corresponding snoop response from a node having said requested data in its cache, or, a corresponding data response from a memory controller that fetched said requested data from a shared memory,
   said nodes each containing at least one processing core to execute said computing system's software; and,
   sending to a detection device from said link probe a notification of said packet, said notification containing:
   1) identification of a node that issued said transaction's request packet;
   2) identification of an identifier for said transaction;
   3) an indication whether said packet contained looked for data in its payload.

2. The method of claim 1 wherein said packet is said request packet.

3. The method of claim 2 wherein said looked for data is an address.

4. The method of claim 2 wherein said data comprises data found in a cache that said request was issued for.

5. The method of claim 1 wherein said packet is a snoop response.

6. The method of claim 1 wherein said packet is a data response sent by a memory controller.

7. The method of claim 1 wherein said method further comprises:
   detecting with a second link probe that observes packets transmitted on a second link that couples one of said nodes and another node within a computing system that a second packet is of said looked for type, said second packet also being part of said transaction, said another node containing at least one processing core to execute said computing system's software; and,
   sending to said detection device from said second link probe a second notification of said second packet, said second notification containing:
   1) identification of said node that issued said transaction's request packet;
   2) identification of said identifier for said transaction;
   3) an indication whether said second packet contained said looked for data in its payload.

8. The method of claim 1 wherein said notification further contains at least one of the following:
   a) an indication of the amount data contained within said packet;
   b) a virtual channel that said packet is transported on along said link;
   c) a virtual network that said packet is transported within along said link.

9. A transaction detection device comprising:
   inputs to couple to communication lines, said communication lines to transport notifications of packets observed on probed point-to-point links within a computing system having point-to-point links between nodes of said computing system that have at least one processing core;
   logic circuitry to determine from said notifications whether a looked for transaction has occurred within said computing system by confirming the existence within said probed point-to-point links of said transaction's request and said transaction's response, said logic circuitry to further identify amongst said notifications at least one notification that contains each of the following:
   1) identification of a looked for requesting node that sent said transaction's request;
   2) an identifier for said transaction;
   3) confirmation that said request contained a specific address said logic circuitry to also compare amounts of data being sent within different virtual networks that are partitioned within a network comprised of said links.

10. The transaction detection device of claim 9 where said logic circuitry is further to identify amongst said notifications at least one notification that contains each of the following:
1) said identification of said looked for requesting node that sent said transaction's request;
2) said identifier for said transaction;
3) confirmation that a response to said request contained specific data.

11. The transaction detection device of claim 9 wherein said logic circuitry is further to determine whether a flow control policy between a pair of nodes has been offended.

12. A testing apparatus, comprising:
a) a plurality of link probes, said link probes to transmit notifications of packets observed by said link probes on respective links to which said link probes are attached, said links within a computing system containing point-to-point links between nodes, each of said nodes having at least one processing core;
b) a transaction detection device comprising:
(i) inputs to couple to communication lines to which said link probes are coupled;
(ii) logic circuitry to determine from said notifications whether a looked for transaction has occurred within said computing system by confirming the existence within said links of said transaction's request and said transaction's response, said logic circuitry to also identify amongst said notifications at least one notification that contains each of the following:
1) identification of a looked for requesting node that sent said transaction's request;
2) an identifier for said transaction;
3) confirmation that said request contained a specific address
said logic circuitry to also compare amounts of data being sent within different virtual networks that are partitioned into a network comprised of said links.

13. The apparatus of claim 12 where said logic circuitry is further to identify amongst said notifications at least one notification that contains each of the following:
1) said identification of said looked for requesting node that sent said transaction's request;
2) said identifier for said transaction;
3) confirmation that a response to said request contained specific data.

14. The apparatus of claim 12 wherein said logic circuitry is further to determine whether a flow control policy between a pair of nodes has been offended.

15. The apparatus of claim 12 wherein each of said link probes comprise:
logic circuitry to identify whether a packet observed on its respective link is of a looked for type.

16. The apparatus of claim 15 wherein said looked for type comprises at least one of the following:
a transaction request;
a snoop response;
a data response.

* * * * *